United States Patent
Lang et al.

(10) Patent No.: US 9,776,592 B2
(45) Date of Patent: Oct. 3, 2017

(54) DOUBLE SWAGE AIRBAG INFLATOR VESSEL AND METHODS FOR MANUFACTURE THEREOF

(71) Applicant: Autoliv ASP, Inc., Ogden, UT (US)

(72) Inventors: Shawn Lang, Ogden, UT (US); Ken Clark, Mountain Green, UT (US)

(73) Assignee: Autoliv ASP, Inc., Ogden, UT (US)

( * ) Notice: Subject to any disclaimer, the term of this patent is extended or adjusted under 35 U.S.C. 154(b) by 303 days.

(21) Appl. No.: 13/973,653

(22) Filed: Aug. 22, 2013

(65) Prior Publication Data

US 2015/0053697 A1 Feb. 26, 2015

(51) Int. Cl.

| | |
|---|---|
| *B60R 21/217* | (2011.01) |
| *B60R 21/272* | (2006.01) |
| *C22C 38/40* | (2006.01) |
| *C22C 38/06* | (2006.01) |
| *C22C 38/04* | (2006.01) |
| *C22C 38/00* | (2006.01) |
| *B21D 41/04* | (2006.01) |
| *B60R 21/26* | (2011.01) |

(52) U.S. Cl.
CPC .......... *B60R 21/217* (2013.01); *B21D 41/04* (2013.01); *B60R 21/272* (2013.01); *C22C 38/002* (2013.01); *C22C 38/04* (2013.01); *C22C 38/06* (2013.01); *C22C 38/40* (2013.01); *B60R 21/2171* (2013.01); *B60R 2021/26082* (2013.01)

(58) Field of Classification Search
CPC .............. B60R 21/217; B60R 21/2171; B60R 2021/26076; B60R 2021/26082; B21K 21/04; B21K 21/06; B21K 21/08; C22C 38/06

See application file for complete search history.

(56) References Cited

U.S. PATENT DOCUMENTS

| | | | |
|---|---|---|---|
| 3,262,823 A | * | 7/1966 | Sadowski et al. ............ 148/621 |
| 4,298,155 A | | 11/1981 | Palovcik |
| 4,722,216 A | | 2/1988 | Fencl |

(Continued)

FOREIGN PATENT DOCUMENTS

WO 2007113690 A2 10/2007

OTHER PUBLICATIONS

International Search Report and Written Opinion regarding International Application No. PCT/US2014/050672 mailed Nov. 12, 2014.

*Primary Examiner* — Barry Gooden, Jr.
(74) *Attorney, Agent, or Firm* — Stephen T. Olson; Harness, Dickey & Pierce, P.L.C.

(57) ABSTRACT

A high strength dual-swaged airbag inflator vessel comprising a high strength metal material, such as low carbon steel, has a swaged terminal end defining two distinct swaged portions. A reduction of diameter within one of the swaged portions is restricted to be less than or equal to about 30% and in certain variations, less than or equal to about 16% to minimize cold work strain hardening and to reduce loss of ductility. In certain aspects, a second swaged portion within the swaged terminal end has a length of less than or equal to about 10 mm. Methods for making such a dual-swaged airbag inflator vessel are likewise provided. Such dual swage designs have improved reliability and performance in high pressure inflator applications, as well as reduced manufacturing costs.

19 Claims, 10 Drawing Sheets

(56) References Cited

U.S. PATENT DOCUMENTS

| | | | |
|---|---|---|---|
| 4,961,576 A | 10/1990 | Meredith | |
| 5,388,322 A * | 2/1995 | Simon | 29/525 |
| 5,620,200 A * | 4/1997 | Garner et al. | 280/728.2 |
| 5,620,205 A * | 4/1997 | Lauritzen et al. | 280/741 |
| 5,626,360 A * | 5/1997 | Lauritzen et al. | 280/741 |
| 5,662,352 A | 9/1997 | Headley et al. | |
| 5,788,275 A * | 8/1998 | Butt et al. | 280/737 |
| 5,836,607 A * | 11/1998 | Wallner | 280/728.2 |
| 6,038,771 A | 3/2000 | Takehara et al. | |
| 6,134,937 A | 10/2000 | Lee et al. | |
| 6,589,369 B2 | 7/2003 | Yokoi et al. | |
| 6,845,552 B2 | 1/2005 | Blough | |
| 7,114,362 B2 | 10/2006 | Mitchell et al. | |
| 7,828,324 B2 * | 11/2010 | Herget | B60R 21/272 280/737 |
| 7,987,792 B2 * | 8/2011 | Jung | B60R 21/272 102/200 |
| 8,172,262 B2 * | 5/2012 | Mayville et al. | 280/741 |
| 2003/0029349 A1 * | 2/2003 | Katsuda et al. | 102/530 |
| 2003/0098572 A1 * | 5/2003 | Katsuda et al. | 280/741 |
| 2004/0041382 A1 * | 3/2004 | Gotoh et al. | 280/741 |
| 2004/0055667 A1 * | 3/2004 | Takada et al. | 148/533 |
| 2005/0146123 A1 * | 7/2005 | Bergmann et al. | 280/741 |
| 2005/0161922 A1 * | 7/2005 | Bilbrey et al. | 280/736 |
| 2005/0173906 A1 * | 8/2005 | Nakayasu et al. | 280/737 |
| 2006/0124156 A1 | 6/2006 | Jackson | |
| 2006/0169368 A1 * | 8/2006 | Lopez et al. | 148/332 |
| 2007/0273131 A1 * | 11/2007 | Smith et al. | 280/736 |
| 2011/0042476 A1 * | 2/2011 | McAlister | 239/5 |
| 2011/0314809 A1 * | 12/2011 | Laspesa et al. | 60/638 |
| 2012/0079958 A1 * | 4/2012 | Nakayasu | 102/530 |
| 2012/0079959 A1 * | 4/2012 | Chen et al. | 102/530 |
| 2012/0308944 A1 * | 12/2012 | Enami et al. | 431/253 |
| 2013/0200600 A1 * | 8/2013 | Bierwirth et al. | 280/740 |
| 2013/0287620 A1 * | 10/2013 | Takabayashi et al. | 420/49 |
| 2014/0230685 A1 * | 8/2014 | Hanano et al. | 102/530 |

* cited by examiner

-- Prior Art --

-- Prior Art --

-- Prior Art --

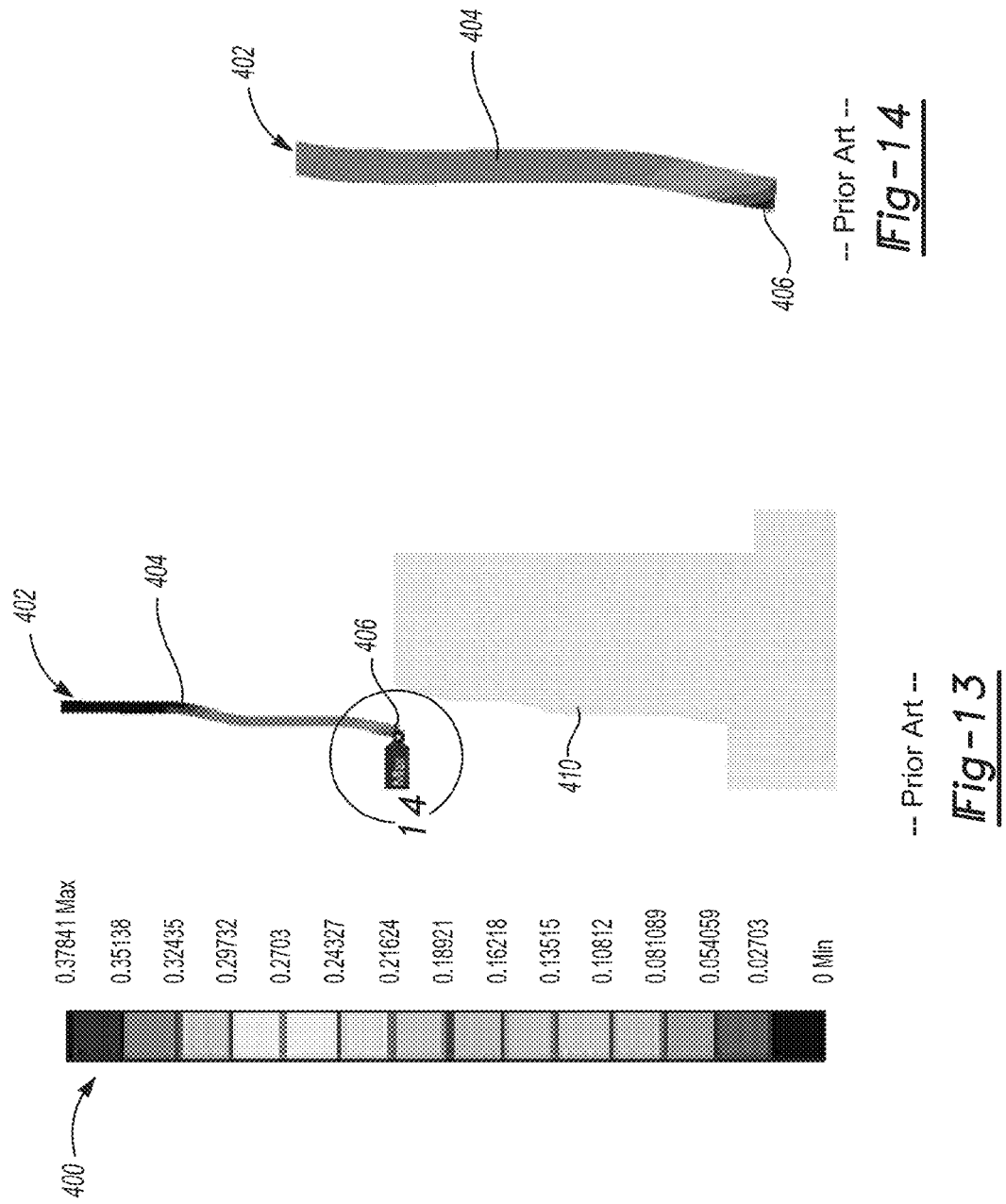

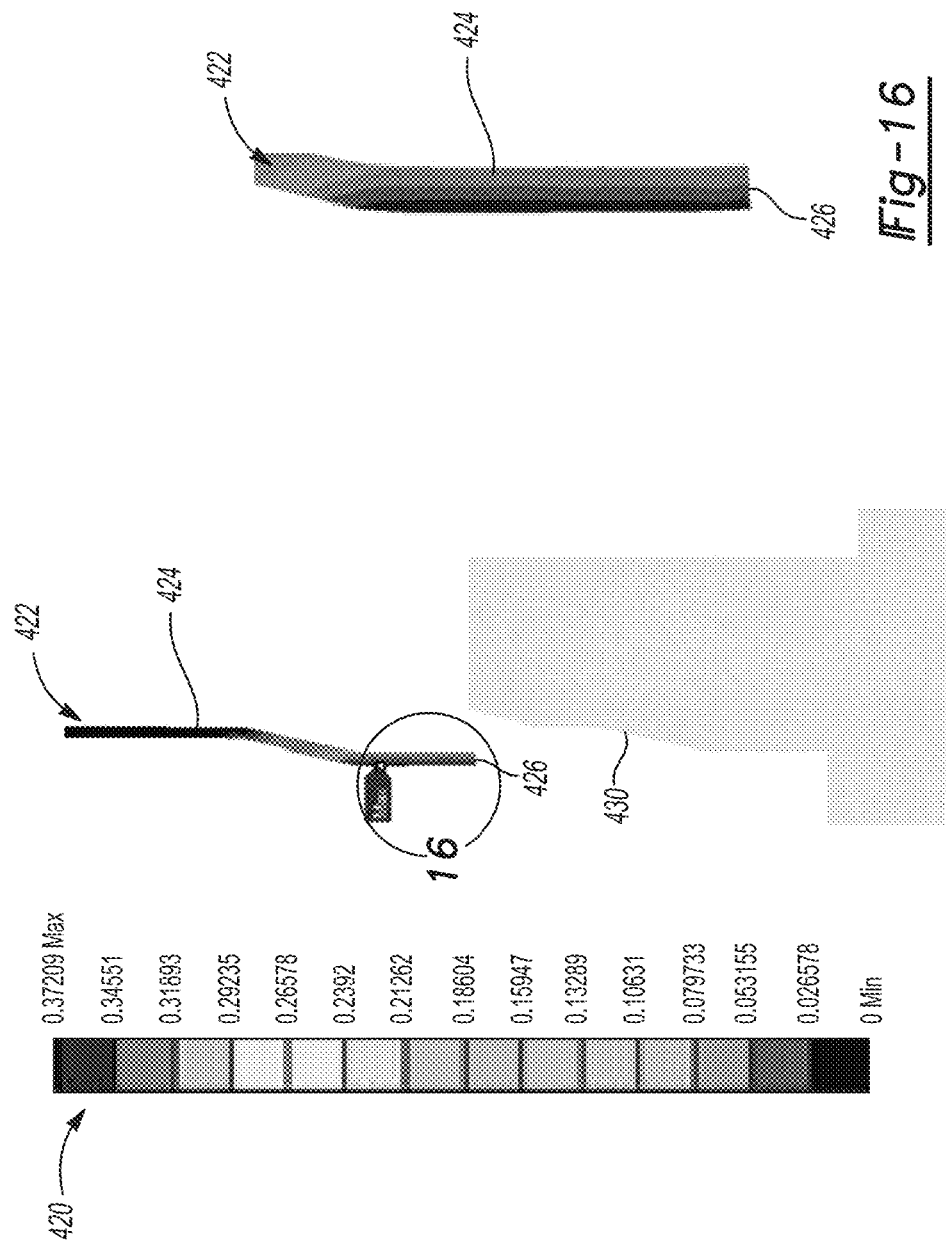

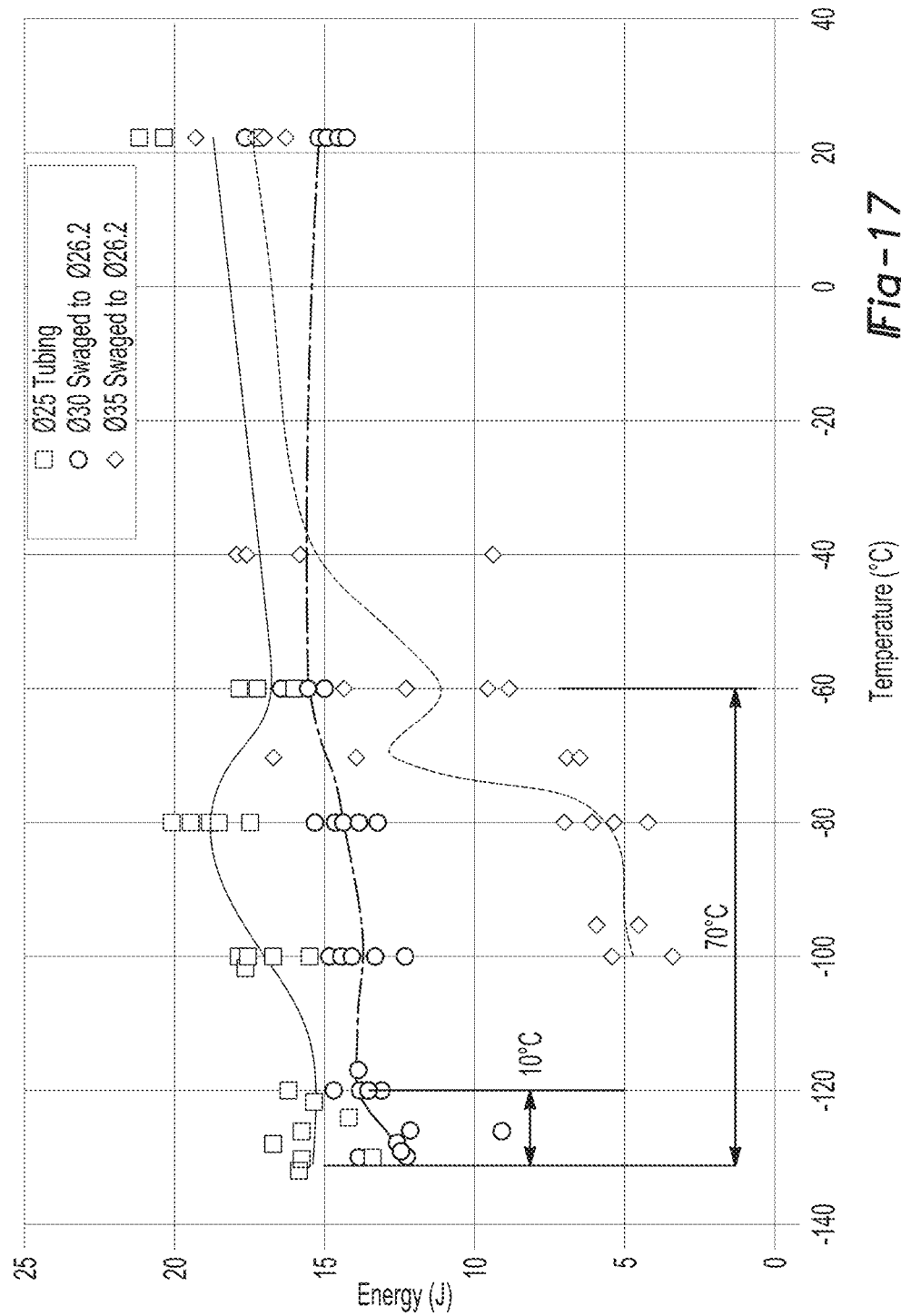

DOUBLE SWAGE AIRBAG INFLATOR VESSEL AND METHODS FOR MANUFACTURE THEREOF

FIELD

The present disclosure relates to inflator devices for passive restraint air bag systems and more specifically to improved methods for making an inflator chamber or vessel made of a high strength material having a double swage design with diminished cold work strain hardening and loss of ductility.

BACKGROUND

This section provides background information related to the present disclosure which is not necessarily prior art.

Passive inflatable restraint systems are often used in a variety of applications, such as in motor vehicles. When a vehicle decelerates due to a collision or another triggering event occurs, an inflatable restraint system deploys an airbag cushion to prevent contact between the occupant and the vehicle to minimize occupant injuries. Airbag systems typically include an inflator that can be connected to the one or more inflatable airbags positioned within the vehicle, and can rapidly produce a quantity of inflation fluid or gas that can fill the airbag(s) to protect the occupant(s). Such inflatable airbag cushions may desirably deploy into one or more locations within the vehicle between the occupant and certain parts of the vehicle interior, such as the doors, steering wheel, instrument panel, headliner, or the like, to prevent or avoid the occupant from forcibly striking such parts of the vehicle interior during collisions or roll-overs.

One common type of inflator device for an airbag system contains a quantity of stored pressurized or compressed fluid (e.g., gas) for release into an airbag. Such designs often involve heating and further pressurizing the stored fluid precursor within a gas storage chamber prior to inflating the airbag. Another common form or type of inflator device generates gas for the airbag cushion by combustion of a pyrotechnic gas generating material. Yet another type of a compressed gas inflator is commonly referred to as a "hybrid inflator," which can supply inflation gas because of a combination of stored compressed gas and combustion products resulting from the combustion of a gas generating pyrotechnic material. Hybrid inflators tend to be used in larger volume airbag applications.

In various aspects, these inflators, whether in pyrotechnic gas generant, a stored gas, or a hybrid type often employ high strength chambers or fluid storage vessels capable of withstanding temperature and gas pressures generated during an airbag deployment. Thus, it is desirable to further improve reliability and robustness of such chambers in the airbag inflator module while exhibiting improved inflation performance and durability, while providing a more economical manufacturing process.

SUMMARY

This section provides a general summary of the disclosure, and is not a comprehensive disclosure of its full scope or all of its features.

In certain aspects, the present disclosure provides a method of forming a dual-swaged airbag inflator vessel. The method may comprise swaging a hollow cylindrical metal workpiece having a first outer diameter by introducing the workpiece into a swage die and applying force to reduce the first outer diameter by less than or equal to about 30% to form a second outer diameter and to reduce the second outer diameter to form a third outer diameter. The swaging process thus forms the dual-swaged airbag inflator vessel having a first swaged portion comprising the second outer diameter and a second swaged portion comprising the third outer diameter.

In other aspects, the present disclosure further provides a method of forming a high strength dual-swaged airbag inflator vessel, which may comprise swaging a hollow cylindrical metal workpiece comprising a high strength low carbon steel alloy having a first outer diameter. The swaging occurs by introducing the hollow cylindrical metal workpiece into a swage die and applying force to reduce the first outer diameter less than or equal to about 16% to form a second outer diameter and to reduce the second outer diameter to form a third outer diameter. In this manner, the dual-swaged airbag inflator vessel having a first swaged portion comprising the second outer diameter and a second swaged portion comprising the third outer diameter is formed. The first swaged portion is substantially free of wrinkling defects and the second swaged portion has a length of less than or equal to about 10 mm.

In certain other aspects, the present disclosure provides a high strength dual-swaged airbag inflator vessel comprising a hollow cylindrical body comprising a high strength metal material having a swaged terminal end. The swaged terminal end comprises a first swaged portion, where a first outer diameter of the hollow cylindrical metal body is reduced to a second outer diameter and a second swaged portion where a second outer diameter is reduced to a third outer diameter. The reduction of the first outer diameter to the second outer diameter is less than or equal to about 30%. In certain aspects, the second swaged portion has a length of less than or equal to about 10 mm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 13 shows a failure elemental analysis of a portion of a terminal end of a single swage design for an inflator vessel;

FIG. 14 shows a partial sectional view of a die that formed the portion of the terminal end of the single swage design;

FIG. 15 shows a failure elemental analysis of a portion of a terminal end of a dual swage design for an inflator vessel formed in accordance with certain aspects of the present disclosure;

FIG. 16 shows a partial sectional view of a die that formed the portion of the terminal end of the dual swage design; and FIG. 17 shows a graph of energy (Joules) versus temperature (° C.) demonstrating ductile to brittle behavior for comparative examples of different swage designs.

Corresponding reference numerals indicate corresponding parts throughout the several views of the drawings.

DETAILED DESCRIPTION

Figure 1:
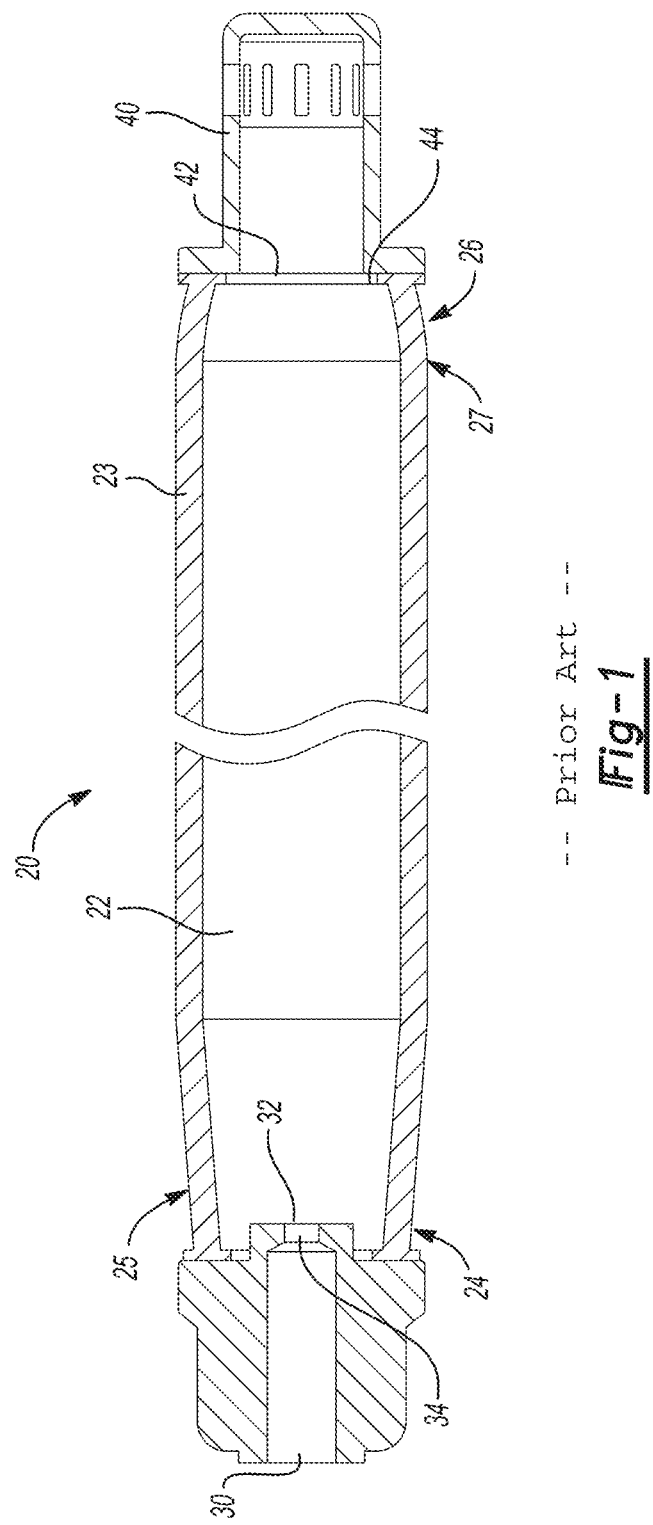
FIG. 1 is a partially cut-away illustration of an exemplary inflator device having a gas storage vessel according to certain aspects of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure relates to devices for providing or supplying an inflation gas to inflatable passive restraint systems for use in vehicles, which are capable of restraining the movement of an occupant in the event of a vehicular collision. In certain aspects, the present disclosure provides a high strength airbag inflator chamber (also referred to herein as a vessel) that supplies an inflation gas to an airbag cushion. In accordance with various aspects of the present technology, the high strength airbag inflator vessel can be formed to have improved mechanical properties, including diminished work hardening and improved ductility. An airbag inflator chamber or vessel includes hollow or open structures within the airbag inflator module that are designed to contain, store, or transport a fluid (e.g., a gas) for inflating the airbag cushion. Such a vessel may be used as part of inflatable restraint devices, such as airbag module assemblies, side impact inflators, seatbelt tensioners, hybrid inflators, and other similar applications. Inflatable restraint devices and systems have multiple applications within automotive vehicles, such as driver-side, passenger-side, side-impact, curtain, and carpet airbag assemblies. Other types of vehicles including, for example, boats, airplanes, and trains may also use inflatable restraints. Inflatable restraint devices typically involve a series of reactions that facilitate production of gas in order to deploy an airbag or actuate a piston. In the case of airbags, for example, actuation of the airbag assembly system and ignition of the gas generant may inflate the airbag cushion within a few milliseconds.

Such airbag inflator vessels typically must withstand high pressure and high temperature conditions during the lifetime of the vehicle, as well as during any deployment event. In certain applications, the airbag inflator vessel is required to withstand relatively high pressures, such as about 5 to 10 kilopounds per square inches (about 35 to 69 MPa) during storage of gas at ambient conditions and typically from about 12 ksi (about 83 MPa) to 20 ksi (about 138 MPa) during deployment of the device. Therefore, airbag inflator vessels in accordance with certain aspects of the present disclosure are made of a high strength material. However, such high strength materials pose potential challenges with regard to ductility and strain hardening resulting from cold work. A common processing technique for airbag inflator storage vessel designs includes a cold work swaging process. As will be discussed in greater detail below, in accordance with various aspects of the present disclosure, detrimental effects of such a swaging process are diminished or avoided in such an inflator vessel by using a new swaging technique that produces at least one terminal end having a double swage design configuration formed in a swaging process.

A simplified schematic of an exemplary conventional airbag inflator device 20 having a stored fluid/gas design is shown in FIG. 1. The inflator device 20 comprises a closed pressure vessel gas storage vessel 22 that is at least in part formed by an elongated generally cylindrical sleeve or generally cylindrical component 23 having a first base end portion 24 and a second opposing diffuser end portion 26. An initiator 30 is positioned at the base end portion 24 and a temporary closure (e.g., a first burst disk 32) can be used to cover and seal a base end opening 34 of the gas storage vessel 22 to prevent fluid communication between the initiator 30 and the gas storage vessel 22. Notably, the base end portion 24 of the generally cylindrical component 23 forms a tapered swage region 25 where the diameter is reduced.

Further, the diffuser end portion 26 of the generally cylindrical component 27 forms a second tapered swage region 27 where the diameter is reduced. A diffuser 40 is positioned at the second opposing diffuser end portion 26 and a second temporary closure (e.g., a second discharge end burst disk 42) can be used to cover a diffuser end portion 44 of the gas storage vessel 22 to prevent fluid communication between the gas storage vessel 22 and the diffuser 40. Upon actuation or activation of the initiator 30, the initiator 30 produces a discharge that ruptures the first burst disk 32 and heats a supply of compressed or pressurized gas stored within the gas storage vessel 22. As the supply of pressurized gas is heated, the internal pressure within the gas storage vessel 22 may be increased to an internal pressure level sufficient to rupture or otherwise open the second burst disk 42. A pressure wave may also be created by the initiator 30 functioning and the breakage of the first burst disk 32, such as to rupture or otherwise open the second burst disk 42.

Fluid communication between the gas storage vessel 22 and the diffuser 40 is established upon the opening of the second burst disk 42. The heated gas then exits the gas storage vessel 22 through the diffuser 40 to initiate deployment of an associated inflatable airbag cushion (not shown).

In such gas storage type inflator devices, temperature and pressure within the gas storage vessel (e.g., 22) typically increases significantly during the initiation stage so as to provide an internal pressure sufficient to rupture the discharge end burst disk and permit gas flow from the storage chamber, through the diffuser and out to the associated inflatable airbag cushion. Thus, such inflator devices are commonly designed and constructed to have a sidewall of significant thickness to withstand the increase in internal pressure realized upon actuation of the inflator device. Typically, compressed gas inflators include a pressure vessel housing or chamber designed so as to be able to withstand pressures of about 1.5 to 2 times the internal pressures created upon actuation of the compressed gas inflator, where such internal pressures can be at least about 12 ksi (about 83 MPa) to 20 ksi (about 138 MPa), by way of non-limiting example. In practice, such pressure vessels are typically elongated cylindrical in form and are made of materials of sufficient strength, e.g., steel or other metals with a predetermined thickness, to withstand the pressure within the vessel, both during normal or pre-actuation conditions, as well as upon actuation and functioning of the airbag device.

Figure 2:
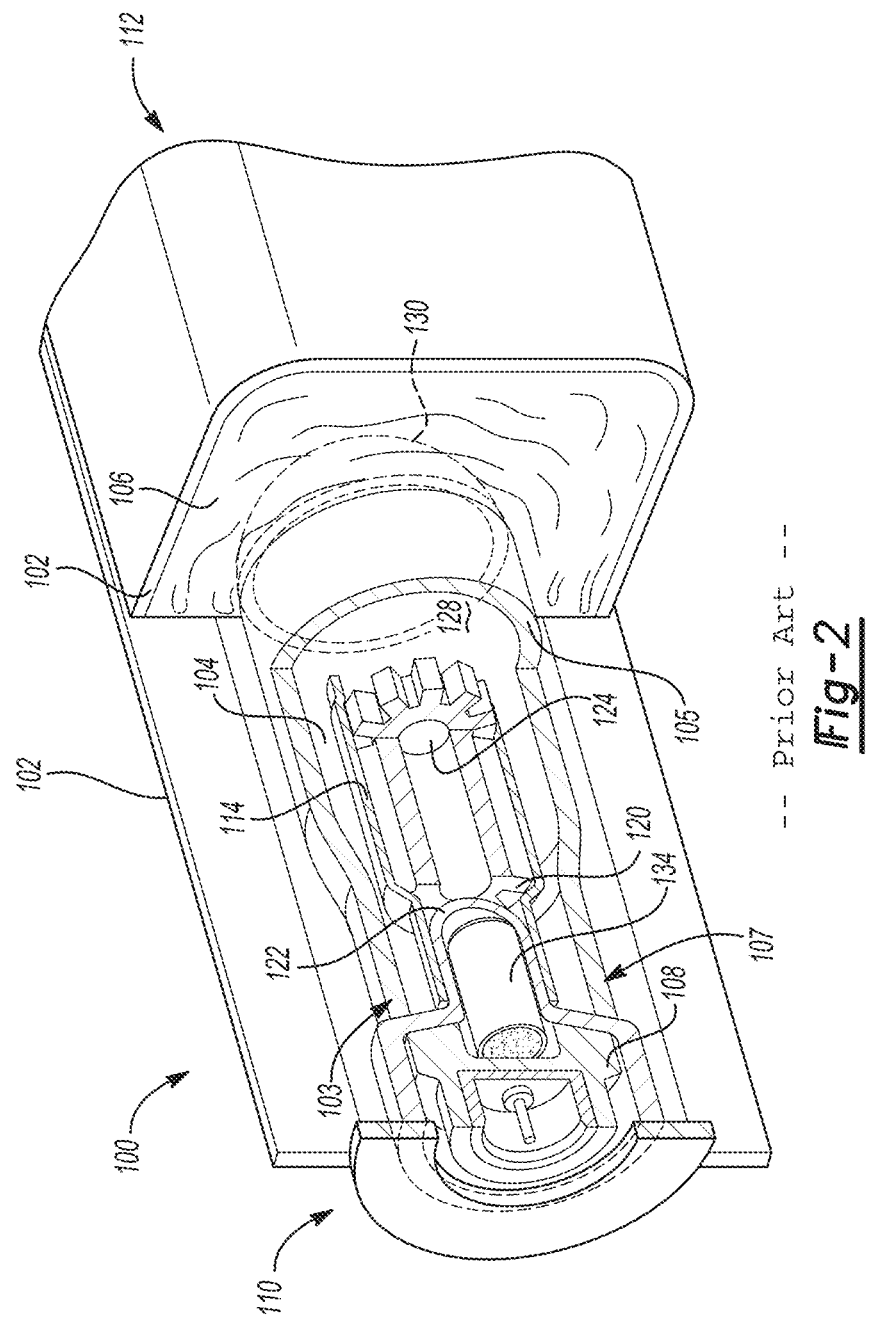
FIG. 2 is a partially cut-away illustration of an exemplary inflator device having a gas storage vessel according to certain other aspects of the present disclosure.

Another simplified schematic of an exemplary hybrid inflator device 100 is shown in FIG. 2. The inflator device 100 includes a housing 102. The housing 102 defines a first end 110 and a second end 112. Within housing 102 is a closed pressure vessel gas storage vessel 104 that is at least in part formed by an elongated generally cylindrical sleeve or generally cylindrical component or vessel 105. An initiator end portion 103 of the generally cylindrical component 105 forms a tapered swage region 107 where the diameter is reduced. The inflator device 100 includes an initiator device 108 that is disposed at least in part within the first vessel 104. The reduced diameter of the tapered swage region 107 facilitates coupling or attachment of the generally cylindrical component 105 with adjacent components, such as the initiator device module 108. Such coupling may be by inertia or friction welding or other conventional joining techniques that establish a gas tight seal.

The first vessel 104 can contain one or more solid gas generants 120 (pyrotechnic material(s) that generate inflation gases by combustion). As shown, the gas generant 120 is stored within a sleeve or receptacle 114. A "pyrotechnic" material, in its simplest form, comprises one or more oxidizing agents and one or more fuels that produce an exothermic, self-sustaining reaction when heated to the ignition temperature thereof. The gas generant grain 120 is preferably in actuating proximity to the initiator device 108 to initiate combustion of the gas generant pyrotechnic material in the gas generant grain 120. The initiator device 108 and the gas generant grain 120 may be separated from one another by a temporary separator 122, such as a burst or rupture disc.

The gas generant grain 120 may define at least one through-channel 124 that permits the flow of a shock wave or gas flow through the solid body of the monolithic gas generant grain 120. A gas or fluid storage media 128 may also be stored in the first vessel 104 in contact with the gas generant material 120. The gas generant grain 120 may be partially or wholly disposed within the first vessel 104 in the housing 102. The storage vessel 104 stores the compressed or pressurized gas storage media 128, which may comprise inert gas or gaseous species capable of reacting to form high-pressure inflation gases. The first vessel 104 and an airbag 106 are respectively sealed from one another by a temporary closure (e.g., a terminal end comprising a second burst or rupture disc 130).

In operation, upon sensing of a collision, roll-over, or other trigger event, an electrical signal is sent to the initiator device 108. The initiator or igniter device comprises a squib 132 centrally disposed within a pyrotechnic initiator material 134 that burns rapidly and exothermically. The squib 132 in the initiator device 108 is capable of actuating or igniting the adjacent pyrotechnic initiator material 134 so as to generate heated gas to cause the burst disc 130 to rupture or burst. As a result, high temperature combustion products are discharged from the initiator device 108 into the first vessel 104 resulting in the heating and, in some cases, reaction of the contents contained therein. After the initiator gas enters the first vessel 104, the gas generant material 120 is ignited and begins to combust, thus forming combustion gases. After the gases generated by the initiator device 108 and gas generant 120 rupture the burst disc 130 fluid communication between the first vessel 104 and the airbag 106. Gases pass through this opening into the associated airbag assembly 106 (which may include complex gas guidance systems), as well.

It should be noted that while the discussion of the inventive technology pertains to gas storage or hybrid type inflator design shown in FIGS. 1 and 2, the present teachings are not exclusively limited to such inflator configurations, but are also generally applicable to other conventional airbag inflator designs that incorporate high pressure storage chambers or vessels formed of high strength materials.

Thus, in certain high-pressure applications, the inflator gas storage chamber or vessel is formed of a high strength metal material. Typically, the high-pressure inflator vessel can be fabricated from a ductile material, typically a metal material, such as steel or aluminum (either formed or extruded, for example). In certain aspects, a particularly suitable high strength material for a high-pressure inflator gas storage vessel comprises a high strength steel. In more specific aspects, such a high strength material is a low carbon steel, which are generally desirable by having relatively greater structural strength, ease of use and comparatively low cost. Suitable high strength low carbon steel alloy may have a total carbon content of less than or equal to about 0.2 mass % of the total alloy composition; optionally less than or equal to about 0.17% by mass of the total alloy composition; optionally less than or equal to about 0.15% by mass of the total alloy composition; and in certain aspects, greater than or equal to about 0.07 mass % to less than or equal to about 0.15 mass % of the total alloy composition. In certain variations, high strength low carbon steel suitable for use in a pressurized inflator gas storage vessel is rated with a yield strength of at least 85 ksi (kilopounds per square inch) or about 586 MPa. In certain variations, the high strength low carbon steel is rated with a tensile strength of greater than or equal to about 115 ksi (about 793 MPa), optionally greater than or equal to about 120 ksi (about 827 MPa), and in certain other variations, a high strength low carbon steel is rated to a tensile strength of greater than or equal to about 145 ksi (about 1,000 MPa).

For example, particularly suitable low carbon steel alloys for use as a pressurized inflator vessel optionally comprise greater than or equal to about 0.07% to less than or equal to about 0.2% by mass carbon in the alloy; optionally greater than or equal to about 1% to less than or equal to about 1.6% by mass manganese in the alloy; optionally greater than or equal to about 0.15% to less than or equal to about 0.35% by mass silicon in the alloy; optionally greater than or equal to about 0.2% to less than or equal to about 0.5% by mass nickel in the alloy; optionally greater than or equal to about 0.15% to less than or equal to about 0.6% by mass aluminum in the alloy; optionally less than or equal to about 1.2% by mass chromium in the alloy; optionally less than or equal to about 0.015% by mass sulfur in the alloy; optionally less than or equal to about 0.02% by mass phosphorus in the alloy; and other impurities and diluents at less than or equal to about 0.5% by mass in the alloy, with a balance comprising iron.

In certain aspects, suitable low carbon high strength steels for forming the high-pressure storage vessels are set forth in Table 1.

TABLE 1

| Element | Low Carbon Alloy 1 | Low Carbon Alloy 2 | Low Carbon Alloy 3 | Low Carbon Alloy 4 | Low Carbon Alloy 5 |
|---|---|---|---|---|---|
| Carbon (Ladle) Mass % | 0.17 max | 0.12 max | 0.12 max | 0.07-0.12 | 0.07-0.12 |
| Carbon (Check) Mass % (maximum) | 0.20 | 0.15 | 0.15 | 0.15 | 0.15 |
| Manganese Mass % | 1.00 max | 1.00-1.40 | 1.00-1.40 | 1.10-1.60 | 1.0-1.6 |
| Silicon Mass % | 0.15-0.35 | 0.15-0.35 | 0.15-0.35 | 0.15-0.35 | 0.15-0.35 |
| Sulfur Mass % (maximum) | 0.015 | 0.015 | 0.015 | 0.015 | 0.015 |
| Phosphorous Mass % (maximum) | 0.020 | 0.020 | 0.020 | — | — |
| Chromium Mass % (maximum) | 1.20 | 1.20 | 1.20 | 0.65 | 0.75 |
| Sulfur + Phosphorous Mass % (maximum) | — | — | — | 0.025 | 0.025 |
| Nickel Mass % | 0.50 max | 0.50 max | 0.20-0.40 | 0.25-0.5 | 0.2-0.5 |
| Aluminum Mass % | 0.020-.060 | 0.015-.060 | 0.015-.060 | 0.050 max | 0.060 max |
| Yield Strength (minimum) | 116 ksi (800 MPa) | 116 ksi (800 MPa) | 116 ksi (800 MPa) | 110 ksi (740 MPa) | 85 ksi (586 MPa) |
| Tensile Strength | 145 ksi (1,000 MPa) | 145 ksi (1,000 MPa) | 145 ksi (1,000 MPa) | 135 ksi (930 MPa) | 115-140 ksi (793-965 MPa) |
| Elongation (minimum) | 9% | 9% | 11% | 10% | 16% |
| Ductile to Brittle Test Temperature (° C.) | −55 | −55 | −55 | −55 | −55 |

Figure 3:
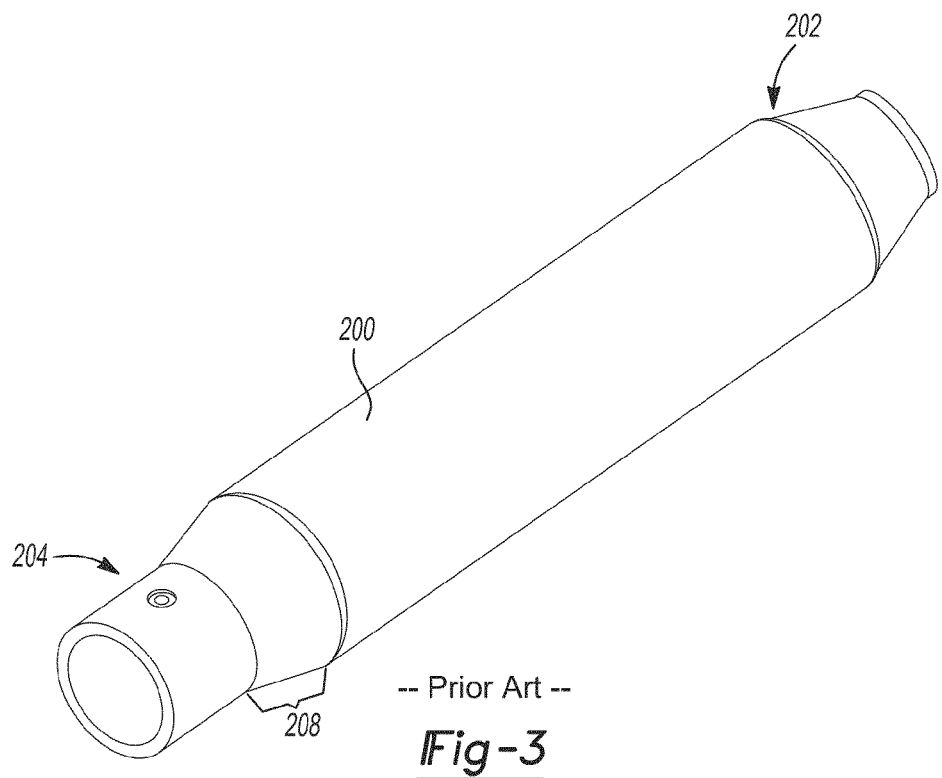
FIG. 3 is a perspective view of a high-strength gas storage chamber or vessel having a single swage design on terminal ends.
Figure 4:
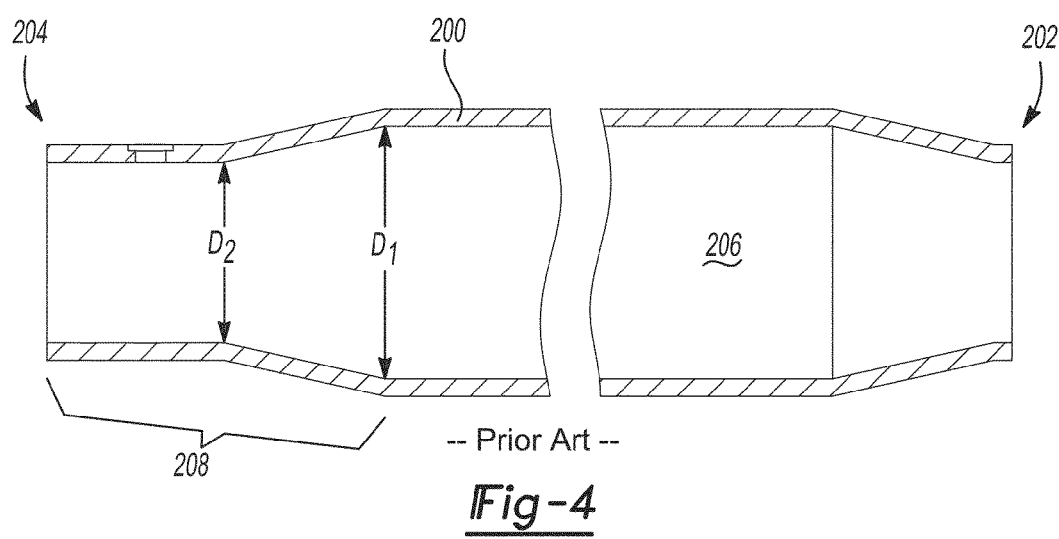
FIG. 4 is a sectional view of the high-strength gas storage vessel having the single swage design of FIG. 3.

It has been found that use of such high strength materials poses particular challenges when the design of the cylindrical component involves one or more tapered or swaged portions having a reduced diameter. In particular, high strength materials can potentially experience loss of ductility and increased work hardening during cold forming. Additionally, undesirable wrinkling on the inner diameter of the swaged section of the vessel can occur, which can result in folds or flaws in the vessel. By way of background, a conventional single swage generally cylindrical inflator gas storage vessel 200 is shown in FIGS. 3 and 4. The gas storage vessel 200 defines a first end 202 and a second end 204. An internal hollow storage vessel 206 is defined inside the gas storage vessel 200. The second end portion 204 of the generally cylindrical gas storage vessel 200 forms a tapered inwardly swaged region 208. As shown, a first inner diameter ($D_1$) is reduced to a second inner diameter ($D_2$), thus defining a single swage design.

Figure 5:
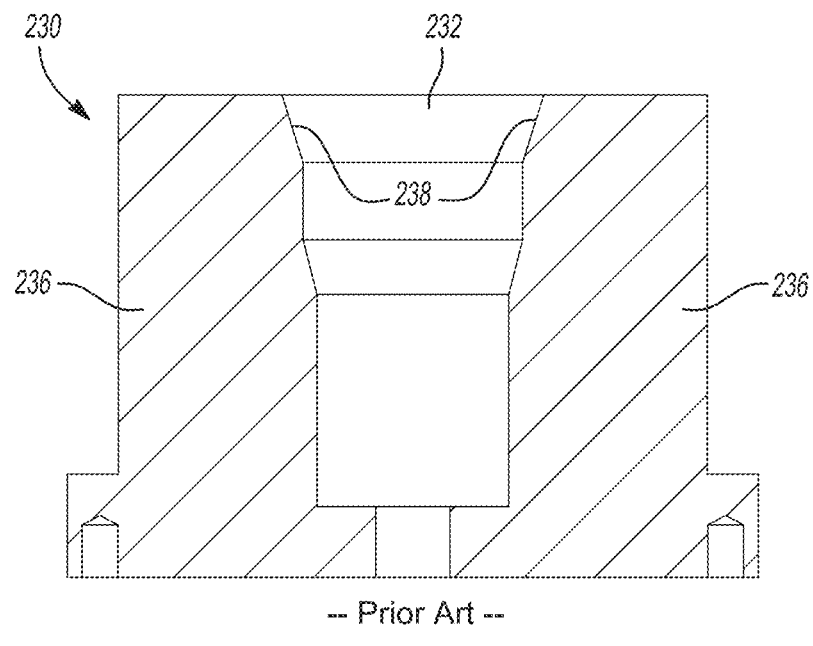
FIG. 5 is a sectional view of a swage die for forming a terminal end of a single swage design of FIGS. 3 and 4.
Figure 6:
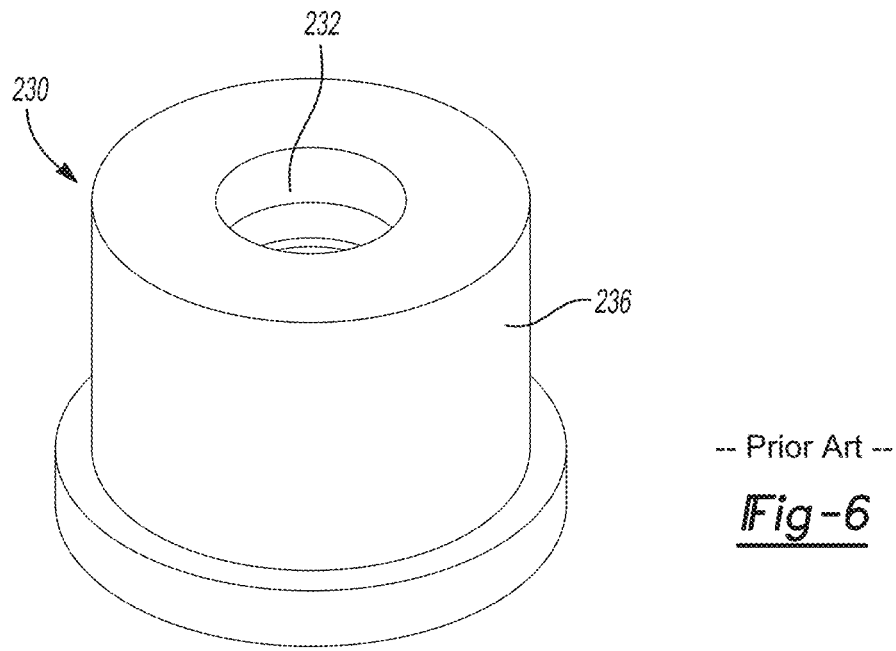
FIG. 6 is a perspective view of the swage die of FIG. 5.

In FIGS. 5 and 6, a swage die 230 is shown, which receives a tubular workpiece (not shown) introduced into a die opening 232. The cylindrical or tubular workpiece can be a metal sheet that is joined at a seam to form a tube or cylinder, or can be cast, die-cast, extruded, wrought, or the like. Thus, a terminal end of the tubular or cylindrical workpiece is received within die opening 232. Die walls 236 have an internally contoured surface 238 that defines a predetermined shape to be applied to the terminal end of the workpiece. As best shown in FIG. 5, the internally contoured surface 238 defines a single swage (a single region in which the diameter of the workpiece is reduced). Axial force or pressure is applied to force the workpiece into the die 230 so that the workpiece conforms to the shape of the contoured surface 238. Typically, such a swaging process is conducted at ambient conditions (e.g., room temperature) and is considered a "cold work" process. Thus, such a die 230 can be used to form the tapered inwardly swaged region 208 of the generally cylindrical inflator gas storage vessel 200 design.

However, as noted above, when using particular high strength materials with such a swage design, especially low carbon steels, it has been observed that certain issues may arise from such a conventional swaging process. For example, such high strength materials may experience increased work hardening and loss of ductility after undergoing the swaging process, which can result in premature fragmentation or failure of the cylindrical inflator gas storage vessels at cold temperatures. Moreover, in forming a single swage reduced diameter design with high strength materials, wrinkling is observed, which introduces folds and flaws into the storage vessel.

In accordance with certain aspects of the present technology, it has been discovered that when using high strength metal materials, in particular, low carbon steel, a reduction in diameter of greater than or equal to about 34% of the cylindrical storage vessel appears to adversely modify microstructure and undesirably produces a significant change in ductile to brittle transition temperatures. Such undesirable changes in the material properties (associated with cold work swaging) can also be related to a distance over which the reduction in diameter takes place. Accordingly, for certain high strength metal materials, a reduction in diameter of the cylindrical storage vessel from a first diameter to a second diameter over a predetermined distance is less than or equal to about 34%, which appears to successfully avoid undesirable changes in ductile to brittle transition temperatures, strain hardening, and wrinkling. In yet other variations, a reduction in diameter of the hollow cylindrical workpiece that forms the storage vessel from a first diameter to a second diameter over a predetermined distance is less than or equal to about 30%; optionally less than or equal to about 28%; optionally less than or equal to about 26%, and optionally in certain variations that achieve particularly advantageous outcomes, a reduction in diameter from a first diameter to a second diameter of the hollow cylindrical workpiece that forms the storage vessel is less than or equal to about 16%, as will be described in greater detail below.

Figure 7:
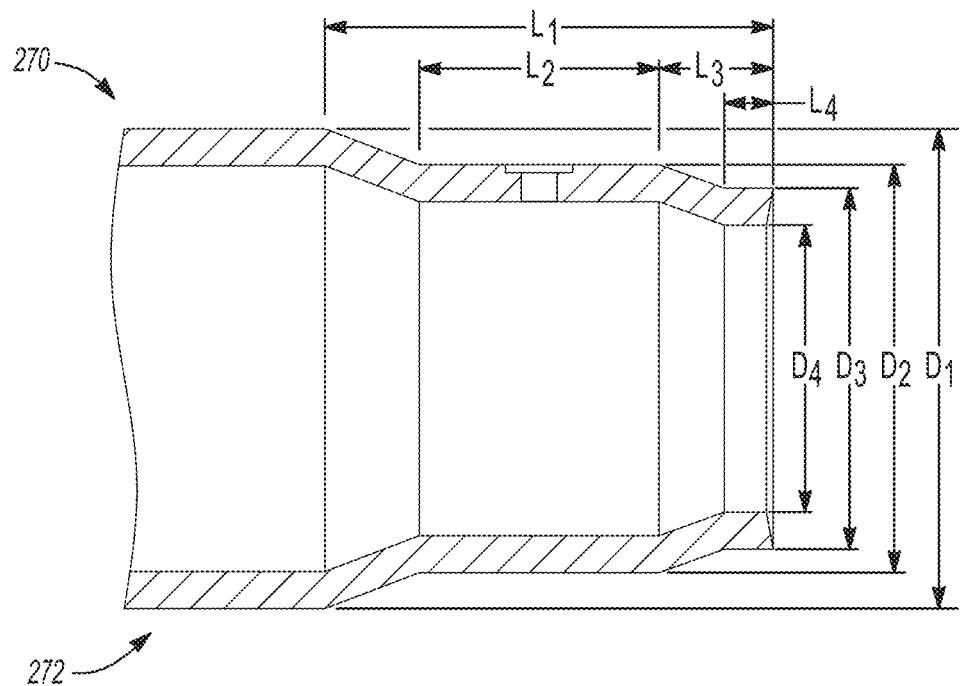
FIG. 7 is a sectional view of a terminal end of an inflator gas storage vessel having a dual swage design in accordance with various aspects of the present disclosure.
Figure 8:
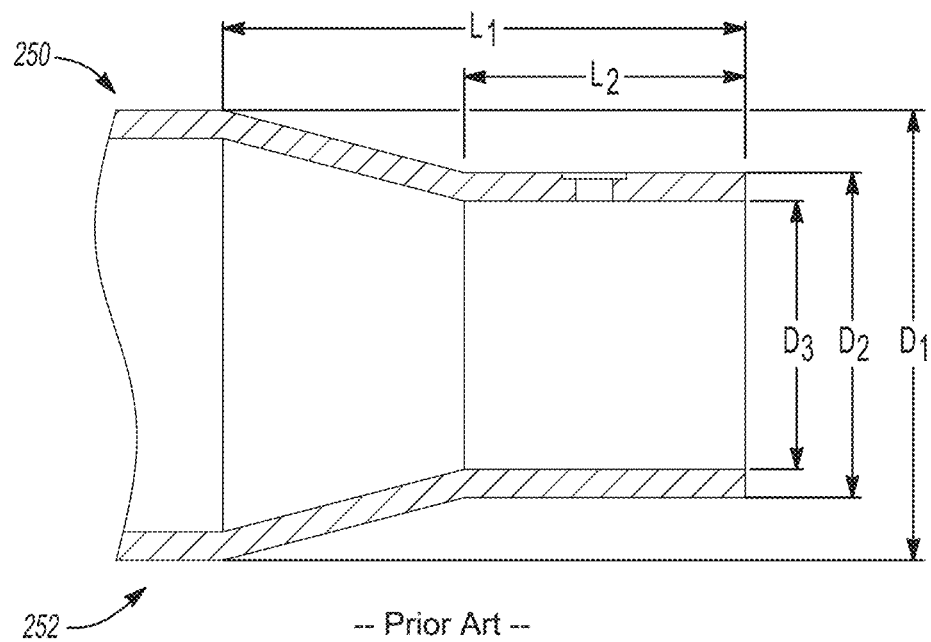
FIG. 8 is a sectional view of a terminal end of an inflator gas storage vessel having a standard single swage design.

By way of example, terminal ends of comparative generally cylindrical storage vessels are shown in FIGS. 7 and 8. FIG. 8 has a conventional single swage design at the terminal end, while FIG. 7 has a dual swage design according to various aspects of the present disclosure. In FIG. 8, prior to conducting any swaging process, a terminal end 252 of a generally cylindrical single swage storage vessel 250 has a first initial outer diameter ($D_1$). The single swage storage vessel 250 is subjected to a swaging process (for example, as described in the context of FIGS. 5 and 6 above) to reduce the initial outer diameter $D_1$ to a second outer diameter $D_2$. Thus, a reduced diameter portion designated "$L_2$" has the second reduced outer diameter $D_2$ as well as an inner diameter $D_3$. Overall, a predetermined distance of the terminal end 252 over which a reduction in diameter occurs is designated "$L_1$," which includes $L_2$. When a single swage design storage vessel 250 is made of a high strength material, like low carbon steel, the amount of reduction in diameter ($D_1$-$D_2$) required appears to introduce high strain levels and strain hardening that results in enhanced brittleness and reduced ductility. By way of non-limiting example, in certain variations, the initial outer diameter $D_1$ may be 40 mm; while the second reduced outer diameter $D_2$ is 30 mm and the inner diameter is 24 mm, (thus the material has an approximate thickness of 3 mm). This amounts to a reduction in diameter of about 25% over a length $L_1$ of about 46.7 mm, where $L_2$ is 25 mm. With certain high strength materials, this design can suffer from wrinkling and strain hardening during swaging.

FIG. 7, by way of comparison, is a generally cylindrical dual swage design storage vessel 270 having a terminal end 272 with a first initial outer diameter ($D_1$). The dual swage storage vessel 270 is subjected to a swaging process, which involves two distinct reductions in diameter. Thus, an initial outer diameter $D_1$ is reduced to an intermediate outer diameter $D_2$. Further, the intermediate outer diameter $D_2$ is further reduced to a final reduced outer diameter $D_3$.

Overall, a predetermined distance of the terminal end 252 over which a reduction in diameter occurs (reducing diameter from $D_1$ down through $D_2$-$D_4$) is designated $L_1$. The intermediate reduced diameter portion is designated "$L_2$" where the intermediate outer diameter $D_2$ occurs. A length of the final reduced portion corresponding to final reduced outer diameter $D_3$ is designated $L_4$. A length $L_3$ includes a transition region where the diameter is reduced from the intermediate outer diameter $D_2$ to the final reduced outer diameter $D_3$.

By way of non-limiting example and for purposes of comparison, in certain variations, the initial outer diameter $D_1$ may be 40 mm (like $D_1$ in FIG. 8), while the intermediate reduced outer diameter $D_2$ is 34 mm. The final reduced outer diameter $D_3$ is 30 mm (like $D_2$ in FIG. 8); while the inner diameter $D_4$ is 24 mm (the material has an approximate thickness of 3 mm). In FIG. 7, length $L_1$ is about 36.9 mm, $L_2$ is about 20 mm, $L_3$ is about 8.64 mm and $L_4$ is about 3.15 mm. This amounts to a reduction in diameter of about 15% over length $L_2$, while a reduction in diameter from initial outer diameter $D_1$ of about 25% only occurs over length $L_4$ (3.15 mm) corresponding to the final reduced outer diameter $D_3$. In comparison, a conventional standard length $L_2$ of a single swage design above a 16% reduction in diameter is usually at least 25 mm. In certain aspects, this design substantially avoids strain hardening and loss of ductility in main structural regions of the dual swage design storage vessel 270. Furthermore, at least a portion of the distance $L_4$ can be consumed or heat treated by inertia or friction welding to remove the strain hardening and reduce any potential physical defects in the region corresponding to $L_3$ and $L_4$. Therefore, such a dual swage design for a storage vessel like 270 made of a high strength material, like low carbon steel, increases ductility and reduces strain/strain hardening occurring in the terminal end region subject to a swaging process.

Thus, in certain aspects, the present disclosure provides a high strength dual-swaged airbag inflator vessel comprising a hollow cylindrical body. The hollow cylindrical body comprises a high strength metal material having a swaged terminal end. The swaged terminal end comprises a first swaged portion, where a first outer diameter of the hollow cylindrical metal body is reduced to a second outer diameter and a second swaged portion where a second outer diameter is reduced to a third outer diameter. The reduction of the first outer diameter to the second outer diameter is less than or equal to about 30% and in certain variations may be less than or equal to about 16%. In certain aspects, the second swaged portion has a length of less than or equal to about 10 mm.

In certain variations, the second swaged portion has a length of less than or equal to about 8.7 mm. In other variations, a portion of the second swaged portion corresponding to the third outer diameter has a length of less than or equal to about 4 mm. In yet other variations, first outer diameter is greater than or equal to about 30 mm to less than or equal to about 45 mm, the second outer diameter is greater than or equal to about 25 mm to less than or equal to about 38 mm and the third outer diameter is greater than or equal to about 18 mm to less than or equal to about 30 mm. In certain aspects, the first outer diameter is about 40 mm, the second outer diameter is about 34 mm and the third outer diameter is about 30 mm.

Figure 9:
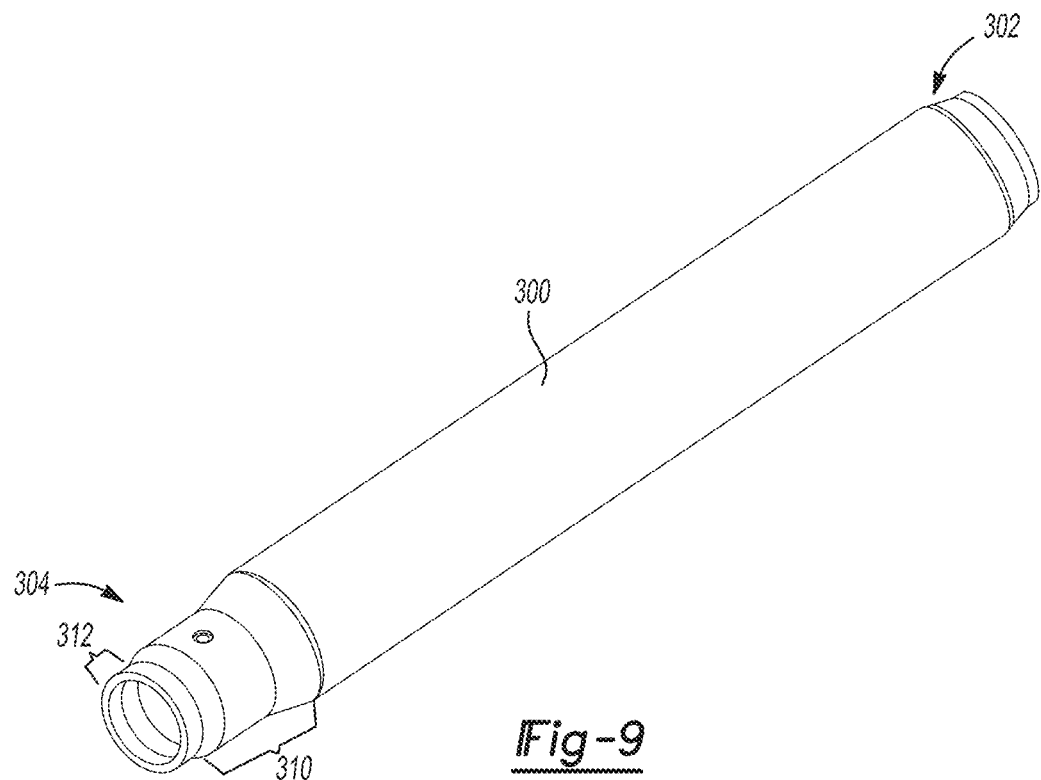
FIG. 9 is a perspective view of a high-strength gas storage vessel having a dual swage design on a terminal end in accordance with certain variations of the present disclosure.
Figure 10:
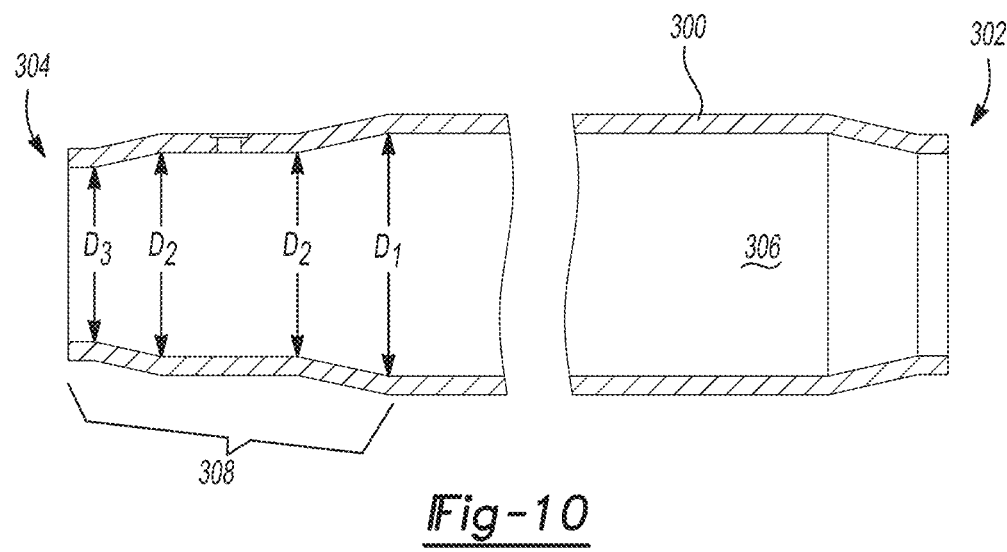
FIG. 10 is a sectional view of the high-strength gas storage vessel having the dual swage design on the terminal end in FIG. 9.

FIGS. 9 and 10 similarly show a generally cylindrical dual swage design storage vessel 300 for use in an airbag inflator assembly (not shown). Such a dual swage design is particularly useful for forming high pressure fluid or gas storage chambers or vessels of high strength materials, like low carbon steel, while minimizing or avoiding loss of ductility and increased work hardening during cold forming that potentially occurs in single swage designs formed of the same material. Additionally, such a dual swage design desirably minimizes or avoids wrinkling on the inner diameter of the swaged section of the chamber or vessel. The gas storage vessel 300 defines a first end 302 and a second end 304. An internal hollow storage chamber 306 is defined inside the gas storage vessel 300. The second end portion 304 of the generally cylindrical gas storage vessel 300 forms a tapered inwardly swaged region 308. As shown, the tapered inwardly swaged region 308 includes a first reduced diameter region 310 (or a first swaged portion) where the inner diameter ($D_1$) is reduced down to a second inner diameter ($D_2$). Further, the tapered inwardly swaged region 308 has a second reduced diameter region 312 (or a second swaged portion), where the second inner diameter ($D_2$) is reduced down to the third final reduced diameter ($D_3$), thus providing a dual swage design.

In other aspects, a method of forming a dual-swaged airbag inflator chamber or vessel is also provided. In certain variations, a high strength low carbon steel is suitable for use in a dual-swaged airbag inflator chamber or vessel that is rated with a yield strength of at least 85 ksi (kilopounds per square inch) or about 586 MPa. In certain variations, the high strength low carbon steel is rated with a tensile strength of greater than or equal to about 115 ksi (about 793 MPa), optionally greater than or equal to about 120 ksi (about 827 MPa), and in certain other variations, a high strength low carbon steel is rated to a tensile strength of greater than or equal to about 145 ksi (about 1,000 MPa). Thus, in accordance with certain aspects of the present disclosure, a workpiece to be swaged is formed of a high strength low carbon steel.

The method may comprise subjecting a hollow cylindrical metal workpiece having a first outer diameter to a swaging process. The swaging may introduce a hollow cylindrical metal workpiece having a first outer diameter into a swage die. The swage die may be one die that has a dual swage design imparted to the workpiece or alternatively, the workpiece may be introduced into two or more distinct swage dies with different swage reductions that will achieve the dual swage design. Force is then applied to the workpiece (typically in an axial direction) to reduce the first outer diameter to a second outer diameter. Where multiple dies are used to achieve the dual swage design, force may be applied in different swaging steps with different levels for distinct dies, as appreciated by those of skill in the art. According to certain aspects of the present teachings, a reduction of the first outer diameter to the second outer diameter is less than or equal to about 30%, although in certain aspects, particularly advantageous properties result when a reduction of the first outer diameter to the second outer diameter is less than or equal to about 16%. Further, the swaging reduces the second outer diameter to a third outer diameter. In certain variations, a reduction of the second outer diameter to the third outer diameter is optionally less than or equal to about 33% and in certain particularly suitable aspects, optionally less than or equal to about 26% reduction in diameter. In this manner, the dual-swaged airbag inflator vessel is formed that has a first swaged portion comprising the region having the second outer diameter and a second swaged portion comprising the region having the third outer diameter.

In certain aspects, the first swaging portion is substantially free of wrinkling defects, especially along the inner diameter of the swaged portion of the terminal end. In other aspects, both the first and second swaging portions are substantially free of wrinkling defects. The term "substantially free" as referred to herein is intended to mean that wrinkles and attendant defects are absent to the extent that undesirable and/or detrimental effects such as cold work strain hardening are avoided. Furthermore, a swaging portion that is substantially free of wrinkles avoids premature failure by minimizing or avoiding altogether loss of ductility due to shifts in ductile to brittle transition temperatures. Such a dual-swaged airbag inflator vessel formed of a high strength material has both significantly improved ductility and reduced strain hardening, as compared to conventional designs having a single swage terminal end formed of the same high strength material.

Figure 11:
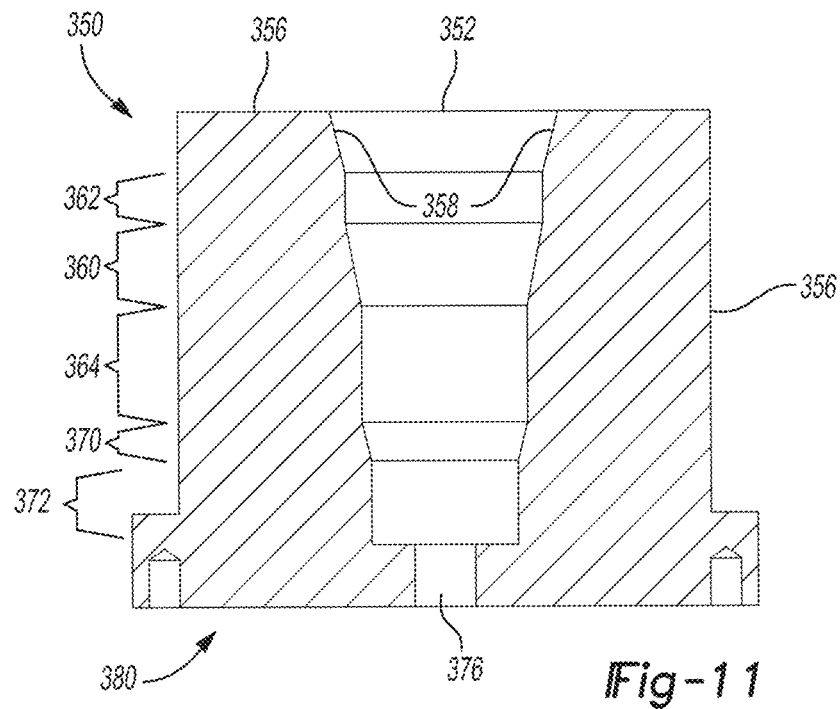
FIG. 11 is a sectional view of an exemplary swage die for forming a terminal end of a dual swage design as in FIGS. 7 and 9-10.
Figure 12:
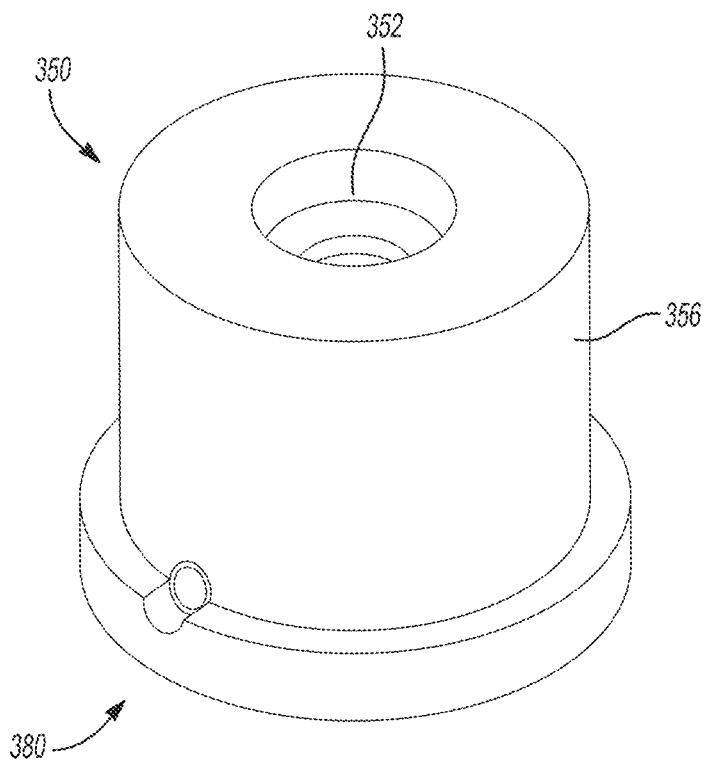
FIG. 12 is a perspective view of the swage die of FIG. 11.

By way of example, FIGS. 11 and 12 show a dual swage die 350 that receives a hollow tubular or cylindrical metal workpiece (not shown) introduced into a die opening 352. As noted above, the hollow cylindrical or tubular workpiece can be a metal sheet that is joined at a seam to form a tube or cylinder, or can be cast, die-cast, extruded, wrought, or the like. Thus, a terminal end of the hollow cylindrical workpiece is received within die opening 352. Die walls 356 have an internally contoured surface 358 that defines a predetermined shape to be applied to the terminal end of the workpiece. As best shown in FIG. 11, the internally contoured surface 358 defines a dual swage design. Axial force or pressure is applied to force the workpiece into the dual swage die 350 towards a terminal end 380 so that the workpiece conforms to the shape of the contoured surface 358. Typically, such a swaging process is conducted at ambient conditions (e.g., room temperature) and is considered a "cold work" process.

Thus, the internally contoured surface 358 has a first transitional region 360 where the workpiece outer diameter is reduced from an initial diameter 362 down to a second outer diameter. The contoured surface 358 thus defines the region corresponding to the reduced second outer diameter region 364 for the workpiece. Thus, together the first transitional region 360 and the reduced second outer diameter region 364 define a first swaged region.

Further into the die opening 352 beyond the first swaged region 364 is a second transitional region 370, where the workpiece outer diameter is reduced from a second outer diameter to a third outer diameter. The contoured surface 358 thus defines the region corresponding to the reduced third outer diameter region 372 for the workpiece. Thus, together the second transitional region 370 and the reduced third outer diameter region 372 together define a second swaged region.

Notably, an open cavity 376 is formed at a terminal end 380 of the dual swage die 350. In certain aspects, the formed workpiece can optionally be accessed by pins via cavity 376 or otherwise ejected from the dual swage die 350 after the application of force and swaging process to be removed from the die 350. Thus, the dual swage die 350 is used to form the dual swage generally cylindrical airbag inflator gas storage vessel design, similar to those shown at terminal second end 304 of generally cylindrical dual swage design storage vessel 300 in FIGS. 9 and 10 Figures or as shown in FIG. 7, by way of example. Any of the features associated with the dual swage storage vessel embodiments described above are contemplated to be formed by the methods of the present teachings.

Furthermore, in certain variations, instead of a single swage die like in FIGS. 11 and 12 having a contoured surface that imparts a dual swaged design to the workpiece, in alternative embodiments, a series of distinct swage dies having different diameter reductions may be used successively to achieve a dual swage design on the workpiece. Thus, the workpiece may be introduced into two or more distinct swage dies with different swage reductions (e.g., a series of dies similar to those in FIGS. 5 and 6 with different diameters) along the internal contoured surface that will achieve the desired dual swage design.

Dual swage inflator vessel designs prepared in accordance with certain methods of the present teachings are compared to conventional single swage inflator vessel designs in FIGS. 13-16. FIGS. 13-14 show a dual swage high strength vessel design using a dual swage die like 350 of FIGS. 9-10 prepared in accordance with certain aspects of the present technology, while FIGS. 15-16 show a single swage high strength vessel design using a single swage die like 230 of FIGS. 5-6. Each of the sectional walls analyzed in FIGS. 13-16 have the same thickness and length, for example, a length of about 45 mm and a wall thickness of about 2.5 mm. As can be seen in FIGS. 13-14 a finite element analysis is conducted for a high strength low carbon steel, where equivalent plastic strain (in inches/inches) is designated at scale 400. A partial view of a terminal end 402 of a dual swaged wall 404 of the hollow cylindrical workpiece is shown after being subjected to the swaging process. Notably, a partial shape of the swage die 410 is shown that forms that dual swaged wall 404. FIG. 14 is a detailed view showing localized strain at a tip 406 of the terminal end 402 of dual swaged wall 404. As can be seen, a maximum strain is about 0.37841 in/in, which is highly localized to only a small portion near tip 406. Furthermore, the peak plastic strain location is localized on the inner diameter of the tip 406 that will be primarily consumed and/or exposed to localized heat (to reverse effects of cold work and strain hardening) during a welding process.

In comparison, FIGS. 15-16 also show finite element analysis, where equivalent plastic strain (in inches/inches) is designated at scale 420. A partial view of a terminal end 422 of a single swaged wall 424 from the hollow cylindrical workpiece is shown after being subjected to the swaging process. A partial shape of the single swage die 430 is shown that forms the single swaged wall 424. FIG. 15 is a detailed view showing localized strain at a tip 426 of the terminal end 422 of single swaged wall 424. As can be seen, a maximum strain is about 0.37209 in/in, which is similar to the maximum strain in dual swaged wall 404 of FIGS. 13-14. However, the maximal strain levels are not localized to the terminal tip 426 of terminal end 422 of single swage wall 424, but rather are spread over a wider region corresponding to the entire inner diameter of the swaged section. This demonstrates that more widespread strain hardening and cold work occurs along the entire inner diameter of the wall 404 in the single swage design. Accordingly, such a single swage design also typically suffers from wrinkling defects along the inner diameter with certain high strength materials subjected to swaging.

As such, while the maximal strain levels are comparable in the single swage inflator vessel and the dual swage inflator vessel, the dual swage design localizes and relegates maximal strain levels (and thus strain hardening) to a small portion of the second swaged region at a terminal tip. As noted above, the terminal tip is substantially consumed during subsequent welding (e.g., inertia or friction welding) of the inflator vessel to adjacent componentry in the airbag module. Accordingly, in certain embodiments, the second swaged portion of a dual-swaged airbag inflator vessel, including the second transitional region (the region that tapers from the second reduced diameter to the third and final reduced diameter) and the region corresponding to the third reduced diameter has a length of less than or equal to about 10 mm. In certain aspects, the length of the second swaged portion of the dual-swaged airbag inflator vessel is less than or equal to about 8.7 mm. In certain aspects, a length of the second swaged portion corresponding to the third reduced diameter is less than or equal to about 4 mm, optionally less than or equal to about 3.5 mm, and in certain aspects, may be less than or equal to about 3 mm.

In certain aspects, it is desirable to reduce third outer diameter by an amount that is less than or equal to about 34% of the first outer diameter and in certain aspects by an amount that is less than or equal to about 30%. It is noted that generally an initial first outer diameter of greater than or equal to about 34 mm diameter is required to minimize the amount of cold work put into the workpiece during swaging. A typical initial diameter is about 40 mm for the workpiece. Further, a minimum final outer diameter of greater than or equal to about 30 mm diameter is typically required at the weld interface to hide the inertia weld curl. Reducing the diameter of the vessel from 40 mm down to 30 mm produces a 25% reduction. Thus, in certain other aspects, the third outer diameter is reduced by an amount that is less than or equal to about 26% of the first outer diameter.

However, in accordance with certain aspects of the present technology, reducing a diameter of the vessel or chamber to an amount of less than or equal to about 16% has been found to be particularly beneficial in diminishing ductile failure modes. It has been found that keeping the reduction of the diameter to less than or equal to about 16% produces minimal change in the ductile to brittle transition temperature and reduces occurrence of potential cold work strain hardening. For example, reducing the initial diameter from 40 mm down to 34 mm produces a 15% reduction in diameter.

FIG. 17 shows comparative data of a modified Charpy Impact Test (ASTM E23) that establishes ductile to brittle temperature ranges for different single swage designs formed of the same high strength 145 ksi (about 1,000 MPa) low carbon steel alloy (see Low Carbon Alloys 1-4 in Table 1 above). The amount of energy absorbed demonstrates ductility, where the higher an amount of energy absorbed indicates more ductility, while less energy absorbed indicates greater brittleness and less ductility. For purposes of comparison, a first example is not swaged, but has a 25 mm cylindrical workpiece. Example 1 is tested and has the highest amount of energy absorbed and thus the highest ductility with ductile to brittle temperature beginning to appear around −130° C. In Example 2, a 30 mm cylindrical workpiece is swaged to a 26.2 mm diameter (thus having a reduction of about 13%), while in Example 3, a second cylindrical workpiece is swaged from 35 mm to 26.2 mm (a reduction of about 25% in diameter). As can be seen in FIG. 17, Example 2 has a fall in ductile to brittle behavior around −120° C. (thus a loss of about 10° C. in ductile to brittle temperature behavior from the unswaged Example 1). However, Example 3 suffers from excessive premature ductile to brittle failure, which begins around −60° C. (thus a loss of about 70° C. in ductile to brittle temperature from the comparative unswaged Example 1).

Accordingly, in the double swage design, the first swaged region has a reduction in diameter from an initial diameter to the second reduced diameter of less than or equal to about 30% and in certain variations may be less than or equal to about 16%. This beneficially reduces loss of ductility and cold hardening over a large portion of the swaged design. In certain aspects, a ductile to brittle transition temperature of a dual-swaged airbag inflator vessel formed in accordance with the present technology may be less than or equal to about −80° C., optionally less than or equal to about −90° C., optionally less than or equal to about −100° C., optionally less than or equal to about −110° C., optionally less than or equal to about −115° C., and in certain variations optionally less than or equal to about −120° C. Moreover, it has been found that in certain variations, keeping the reduction in diameter below 16% appears to eliminate wrinkling defects on the inner diameter of the swaged workpiece comprising a high strength material that forms the storage vessel.

A second swaged portion may have a larger reduction in diameter (e.g., from the second reduced outer diameter to the third reduced diameter), but in the double swage design, strain is highly localized in the terminal portion of the second swaged design. Thus, as discussed above, the second swaged portion may be less than or equal to about 10 mm, optionally less than or equal to about 8.7 mm. A benefit of certain dual swaged designs is that only a small portion (e.g., less than or equal to about 10 mm) is above a 16% reduction in diameter. Moreover, a portion of the terminal end, (e.g., 2-2.5 mm) of this will be consumed in the inertia weld and adjacent regions are subject to heat that reduces the microstructural cold work effects. Wrinkling can also be minimized or eliminated if the reduction in diameter is kept to less than or equal to about 25% and the length of reduction is less than or equal to about 3.5 mm.

As discussed above, in certain variations of a dual swage high pressure airbag inflator chamber or vessel comprising a high strength low carbon steel alloy has a first outer diameter greater than or equal to about 30 mm to less than or equal to about 45 mm, a second outer diameter greater than or equal to about 25 mm to less than or equal to about 38 mm and a third outer diameter greater than or equal to about 18 mm to less than or equal to about 30 mm. In certain other variations, the first outer diameter is about 40 mm, the second outer diameter is about 34 mm and the third outer diameter is about 30 mm.

In certain other aspects, the present disclosure provides a method of forming a high strength dual-swaged airbag inflator vessel. The method optionally includes swaging a hollow cylindrical metal workpiece having a first outer diameter by introducing the hollow cylindrical metal workpiece into a swage die. As discussed above, a single dual swage die can be used or a series of distinct single swage dies with different diameters that can form a dual swage design on the workpiece. Force is applied to the workpiece to reduce the first outer diameter to a second outer diameter. In certain variations, the reduction from the first outer diameter to the second outer diameter is less than or equal to about 30% of the first outer diameter and in certain variations may be less than or equal to about 16%. Force is also applied to reduce the second outer diameter to a third outer diameter. In certain aspects, the application of force may be in a single process step for a unitary dual swage die or alternatively may be conducted as distinct process steps with a series of distinct swage dies. Thus, the dual-swaged airbag inflator vessel is formed having a first swaged portion comprising the second outer diameter and a second swaged portion comprising the third outer diameter, where the first swaged portion is substantially free of wrinkling defects and the second swaged portion has a length of less than or equal to about 10 mm. Such a method for forming the double swage vessel provides an airbag inflator chamber having diminished work hardening and improved ductility.

In certain variations, the methods are particularly suitable for use with low carbon steel alloys that optionally comprise greater than or equal to about 0.07% to less than or equal to about 0.2% by mass carbon in the alloy; optionally greater than or equal to about 1% to less than or equal to about 1.6% by mass manganese in the alloy; optionally greater than or equal to about 0.15% to less than or equal to about 0.35% by mass silicon in the alloy; optionally greater than or equal to about 0.2% to less than or equal to about 0.5% by mass nickel in the alloy; optionally greater than or equal to about 0.15% to less than or equal to about 0.6% by mass aluminum in the alloy; optionally less than or equal to about 1.2% by mass chromium in the alloy; optionally less than or equal to about 0.015% by mass sulfur in the alloy; optionally less than or equal to about 0.02% by mass phosphorus in the alloy; and other impurities and diluents at less than or equal to about 0.5% by mass in the alloy, and a balance comprising iron.

In various aspects, the present disclosure provides a high strength dual-swaged airbag inflator vessel formed of a high strength material that minimizes the risk of cold deployment fragmentation. Moreover, high strength dual-swaged airbag inflator vessels eliminate the need to perform a secondary manufacturing operation to minimize such a risk of cold deployment. For example, high strength dual-swaged airbag inflator vessels prepared in accordance with various aspects of the present disclosure can eliminate the need for ultrasonic testing of chambers to detect flaws/wrinkles, which are customarily necessary for quality control. In this regard, scrap during manufacturing is also reduced, as a higher quantity of products pass quality control thresholds. Furthermore, the present technology can eliminate the need to anneal/heat treat the terminal end of the chamber or vessel to restore the cold ductility properties, thus eliminating another manufacturing step and reducing manufacturing complexity and cost.

Additionally, the methods of the present disclosure for forming the dual swage design inflator vessels advantageously reduce an amount of press force required to form the vessel in the swage die. This results in increased tool life. Furthermore, the present technology can eliminate use of lubrication during the swaging/forming process.

Moreover, employing a high strength dual-swaged airbag inflator vessel or chamber allows improved inflator module designs. For example, by using a double swage chamber, smaller end components can be used as the final diameter can be significantly reduced by the double swage design and therefore the adjacent equipment (e.g., base dome and diffuser) can be reduced in diameter. This serves to beneficially reduce the weight of the inflator, reduces the cost of the components, and a total envelope size of the inflator.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a dual-swaged airbag inflator vessel from a hollow cylindrical metal workpiece having a first outer diameter, the method comprising:
    swaging a first portion of a terminal end of the workpiece at a cold working temperature to reduce the first outer diameter of the first portion by a first amount to a second outer diameter, the second outer diameter being less than the first outer diameter; and
    swaging a second portion of the terminal end for a second time at the cold working temperature to reduce the second portion by a second amount from the second outer diameter to a third outer diameter, the first portion of the terminal end including the second portion of the terminal end, the first portion having a first length and the second portion having a second length that is less than the first length, the first and second portions extending to a distalmost end of the workpiece, the third outer diameter being less than the second outer diameter, wherein a sum of the first amount and the second amount is less than 26 percent.

2. The method of claim 1, wherein the first amount is less than or equal to 16 percent.

3. The method of claim 1, wherein the second length is less than or equal to 10 mm.

4. The method of claim 1, further comprising:
    inserting the terminal end of the workpiece into an opening in a dual swage die, the dual swage die; and
    applying an axial force to move the terminal end further into the dual swage die and force the terminal end into engagement with an internally contoured surface of the dual swage die, the internally contoured surface including a first cylindrical surface having a first inner diameter, a second cylindrical surface having a second inner diameter that is less than the first inner diameter, and a third cylindrical surface having a third inner diameter that is less than the second inner diameter.

5. The method of claim 4 wherein:
    the internally contoured surface also has a first tapering cylindrical surface and a second tapering cylindrical surface, the first tapering cylindrical surface extending axially between the first and second cylindrical surfaces, the second tapering cylindrical surface extending axially between the second and third cylindrical surfaces;
    swaging the first portion of the terminal end to reduce the first portion by the first amount includes forcing the first portion into engagement with the first tapering cylindrical surface; and
    swaging the second portion of the terminal end for the second time to reduce the second portion by the second amount includes forcing the second portion into engagement with the second tapering cylindrical surface.

6. A method of forming a dual-swaged airbag inflator vessel from a hollow cylindrical metal workpiece having a first outer diameter, the method comprising:
    swaging a first portion of a terminal end of the workpiece at a cold working temperature to reduce the first outer diameter of the first portion by a first amount to a second outer diameter, the second outer diameter being less than the first outer diameter; and
    swaging a second portion of the terminal end for a second time at the cold working temperature to reduce the second portion by a second amount from the second outer diameter to a third outer diameter, the first portion of the terminal end including the second portion of the terminal end, the first portion having a first length and the second portion having a second length that is less than the first length, the first and second portions extending to a distalmost end of the workpiece, the third outer diameter being less than the second outer diameter, wherein the first and second amounts are each less than or equal to 16 percent.

7. An airbag inflator vessel comprising:
    a tubular body having a terminal end, the terminal end including:
        (i) a first cylindrical portion having a first outer diameter;
        (ii) a second cylindrical portion located distally relative to the first cylindrical portion and having a second outer diameter that is less than the first outer diameter by a first amount; and
        (iii) a third cylindrical portion located distally relative to the second cylindrical portion and having a third outer diameter that is less than the second outer diameter by a second amount, wherein a sum of the first and second amounts is less than 26 percent.

8. The airbag inflator vessel of claim 7, wherein the first amount is less than or equal to 16 percent.

9. The airbag inflator vessel of claim 7, wherein the first and second amounts are each less than or equal to 16 percent.

10. The airbag inflator vessel of claim 7, wherein the third cylindrical portion has a length that is less than or equal to 10 mm.

11. The airbag inflator vessel of claim 7, wherein the third cylindrical portion has a length that is less than or equal to 4 mm.

12. The airbag inflator vessel of claim 7, wherein the terminal end further includes:
   a first hollow conical frustum portion disposed axially between the first cylindrical portion and the second cylindrical portion; and
   a second hollow conical frustum portion disposed axially between the second cylindrical portion and the third cylindrical portion.

13. The airbag inflator vessel of claim 12, wherein the first hollow conical frustum portion extends from the first cylindrical portion to the second cylindrical portion.

14. An airbag inflator vessel comprising:
   a hollow cylindrical body have a first end, a second end, and an inner surface that defines a storage chamber extending between the first and second ends, the body including an untapered region disposed between the first and second ends and a tapered region disposed at the second end, the untapered region having a first outer diameter, the tapered region including:
      (i) a first cylindrical portion located adjacent to the untapered region and having a second outer diameter that is less than the first outer diameter by a first amount; and
      (ii) a second cylindrical portion disposed axially between the first cylindrical portion and the second end of the hollow cylindrical body, the second cylindrical portion having a third outer diameter that is less than the second outer diameter by a second amount, wherein each of the first and second amounts is less than or equal to 16 percent.

15. The airbag inflator vessel of claim 14, wherein a sum of the first amount and the second amount is less than 26 percent.

16. The airbag inflator vessel of claim 14, wherein the second cylindrical portion has a length that is less than or equal to 10 mm.

17. The airbag inflator vessel of claim 14, wherein the second cylindrical portion has a length that is less than or equal to 4 mm.

18. The airbag inflator vessel of claim 14, wherein the tapered region further includes:
   a first hollow conical frustum portion disposed axially between the untapered region and the first cylindrical portion of the tapered region; and
   a second hollow conical frustum portion disposed axially between the first cylindrical portion and the second cylindrical portion.

19. The airbag inflator vessel of claim 14, wherein the tapered region is free of any diameter enlargements in a direction extending axially from the untapered region of the hollow cylindrical body to the second end of the hollow cylindrical body.

* * * * *